United States Patent Office 3,491,130
Patented Jan. 20, 1970

3,491,130
PROCESS FOR THE PREPARATION OF
GONA-1,3,5(10),8,14-PENTAENES
George C. Buzby, Philadelphia, and Herchel Smith,
Wayne, Pa., assignors to American Home Products Corporation, New York, N.Y., a corporation of Delaware
No Drawing. Filed Oct. 4, 1968, Ser. No. 765,025
Int. Cl. C07c 167/02, 169/12, 171/07
U.S. Cl. 260—397.5                5 Claims

ABSTRACT OF THE DISCLOSURE 13-alkyl-17ξ-hydroxygona - 1,3,5(10),8,14 - pentaene, acetates, are provided by acetylating and cyclizing, in one step, a corresponding 13-alkyl-17ξ-hydroxy-8(14)-secogona-1,3,5(10),9(11)-tetraene - 14 - one with a reagent comprising acetic anhydride and aqueous perchloric acid in a non-polar, inert organic solvent, preferably ethyl acetate. In contrast to the prior art procedure which requires two steps, more than two days and reflux conditions, the instant process is complete in one step, in five minutes and at room temperature. The products of the process (I) are harmonally active as estrogens and are useful, e.g., to prepare harmonally-active steroids, such as estradiol.

This inventon relates to a novel ring closure process for the preparation of steroid compounds having pharmacological activity and utility as intermediates in the preparation of steroid compounds having pharmacological activity. More particularly. the invention provides gona-1,3,5(10),8,14-pentaene, acetates by acetylating and cyclizing, in one step, the corresponding 8,14-secogona-1,3,5(10),9(11-tetraen-17ξ-ol-14-ones.

The compounds prepared by this invention are, in essence, gona-1,3,5(10),8,14-pentaene, 17-acetates of Formula I:

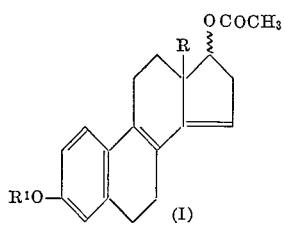

wherein R and R¹ are alkyl of from about 1 to about 20 carbon atoms. Compounds of Formula I are useful per se, being included in the subject matter of G. A. Hughes and H. Smith, U.S. 3,202,686, wherein they are taught to possess hormonal effects in animals as evidenced by standard pharmacological tests, including estrogenic and lipid shifting effects. Furthermore, compounds of Formula I are of value as intermediates for the preparation of compounds exhibiting harmonal effects in animals by standard pharmacological tests. For example, 13-methyl-17β-hydroxy-3-methoxygona - 1,3,5(10),8,14 - pentaene, acetate, a compound of Formula I wherein R and R₁ are methyl, can be selectively reduced, hydrolyzed, selectively reduced again, and demethylated to provide estradiol, a compound whose clinical efficacy for replacement therapy in estrogen deficiency is a matter of common knowledge and experience.

Heretofore it has been proposed to provide compounds of Formula I by a two-step process comprising, first, reacting a 8,14 - secogona-1,3,5(10),9(11)-tetraen-17ξ-ol-14-one of Formula II:

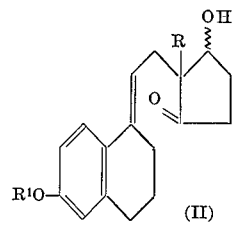

wherein R and R¹ are as above defined, with acetic anhydride and pyridine in benzene, to provide, after 48 hours of standing, the corresponding 8,14-seco-17ξ-ol, acetate of Formula III:

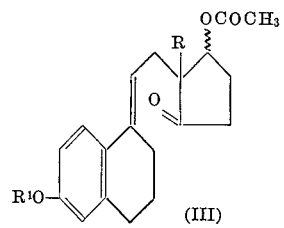

wherein R and R¹ are as above defined and second to wash the reaction mixture until neutral, then to cyclize the compound of Formula III with benzene and p-toluenesulfonic acid, finally obtaining the compound of Formula I after two stages in over two days. It would be of substantial advantage to shorten this process and one means suggesting itself would be to acetylate and cyclize the compound of Formula II in one step. However, those skilled in the art would view such a proposal generally pessimistically because the conditions for cyclization of seco steroids used until now (using an acidic dehydration process) are generally incompatable with the conditions which have been thought to be best for introduction of the 17-acetyl group (acetic anhydride and a base, e.g., pyridine). It has now been surprisingly been found possible, however, to effect such a ring closure and simultaneous acetylation and there are now provided the desired advantages: a very brief reaction time and the elimination of an extra process step. Instead of reflux conditions and a total elapsed time of over two days, the instant process provides the desired compound at moderate reaction temperatures and in only a very short reaction time, i.e., 3 to 15 minutes.

The valuable advantages noted above are obtained with facility by practice of the means of the instant invention which is, in essence: a process for the preparation of a gona-1,3,5(10),8,14-pentaene of Formula I:

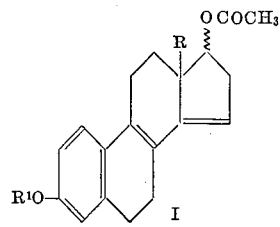

wherein R and R¹ are alkyl of from about 1 to about 20 carbon atoms, which comprises treating the corresponding 17-hydroxy-8(14)-secosteroid with acetic anhydride and aqueous perchloric acid in a substantially non-polar, inert organic solvent until cyclization and replacement of the 17-hydroxy group by a 17-acetoxy group is substantially complete.

As embodiments, the instant invention contemplates a process as first above defined wherein the reaction is carried out at a temperature of from about 15° C. to about 40° C. for from about 3 to about 15 minutes; and a process as first above defined wherein the said solvent is ethyl acetate.

In addition, special mention is made of several other preferred embodiments. These are:

A process as first above defined wherein said gona-1,3,5(10),8,14-pentaene is 13-methyl-17β-hydroxy-3-methoxygona-1,3,5(10),8,14-pentaene, acetate; this compound can be converted to estradiol 3-methyl ether by hydrogenating in benzene over 10% palladium on charcoal to produce 3-methoxyestra-1,3,5(10),8(9)-tetraen-17β-ol, acetate, hydrolyzing with 2% mathanolic KOH to produce 3-methoxyestra-1,3,5(10),8(9)-tetraen-17β-ol; and reducing with lithium in liquid ammonia to produce 3-methoxyestra-1,3,5(10)-trien-17β-ol (estradiol 3-methyl ether); demethylation then produces the valuable compound estradiol; and A process as first above defined wherein said gona-1,3,5(10),8,14-pentaene is 13-ethyl-17β-hydroxy-3-methoxygona-1,3,5(10),8,14-pentaene, acetate.

The term "(lower)alkyl" includes alkyl groups, straight and branched chain and alicyclic of from about 1 to about 6 carbon atoms, illustrative members of which are methyl, ethyl, n-propyl, i-propyl, n-butyl, t-butyl, n-pentyl, 2-methylpentyl, n-hexyl, cyclopentyl, and the like. "Alkyl groups of from about 1 to 20 carbon atoms" includes "(lower)alkyl groups" as above defined and, in addition, groups such as n-octyl, n-decyl, n-undecyl, n-tetradecyl, n-octadecyl and n-eicosyl and branched chain isomers thereof. Generally, preferred alkyl groups are methyl or ethyl groups. The term "substantially non-polar, inert organic solvent" when used herein and in the appended claims, contemplates a family of diluents for the reaction which excludes solvents which would react with acetic anhydride. For example, water and alcohols would not be useful; the only water acceptable is that inherently present in the aqueous perchloric acid. Illustrative solvents are, for example, hydrocarbons, e.g., hexane, heptane, cyclohexane, benzene, toluene, xylene, and the like; chlorinated hydrocarbons, e.g., methylene chloride, chloroform, carbon tetrachloride and the like; ethers, e.g., diethyl ether, diisopropyl ether, and the like; ketone, e.g., acetone methyl isopropyl ketone and the like; and esters—especially preferred are (lower) alkyl (lower)alkanoates, such as methyl acetate, ethyl acetate, ethyl n-propionate, i-propyl acetate, n-hexyl acetate, ethyl n-hexanoate, n-hexyl n-hexanoate and the like. The wavy line at C–17 in the formulae indicates that the instant process provides epimers of either α- or β-configuration at C–17, having the same configuration as that of the starting material.

The 17-hydroxy-8(14)-secosteriods of Formula II used as starting materials in the instant processes are conveniently prepared by condensing the appropriate 1-vinyl-1-hydroxytetralin with the corresponding 2-alkylcyclopentane-1,3-dione to produce the corresponding 14,17-diketo-8(14)-secosteroid (as described in British Patent No. 1,041,273) and selectively reducing the 17-keto group. A microbiological method can be used if the 17β-hydroxy epimer is desired; reduction with lithium aluminum tri-(lower)-alkoxy hydride is useful if the 17α hydroxy epimer is desired. Means employing the microbiological method are well known to those skilled in the art. The fermentation of seco compounds with Saccharomyces uvarum is described by H. Gibian, K. Kieslich, H. J. Koch, H. Kosmol, C. Rufer, E. Schroder and R. Vossing in Tetrahedron Letters No. 21, pp. 2321–2330 (1966) and by C. Rufer, H. Kosmol, E. Schroder, K. Kieslich and H. Gibian in Liebegs Ann. Chem. 702, 141–148 (1967). With respect to the use of lithium aluminum tri(lower)alkoxy hydride to produce the 17α-epimeric compounds of Formula II, it has been found that tetrahydrofuran is a useful solvent for the reduction and that the reduction will take place even on standing at about 25° C. Preferably, however, the reduction is carried out at less han 100° C., especially useful is about 70° C., in order to mainimize any tendency to form byproducts. Useful reducing agents are lithium aluminum tri(lower)alkoxy hydrides wherein the alkoxy group contains from about 1 to about 6 carbon atoms. Especially convenient and preferred is lithium aluminum tri-t-butoxy hydride. In one manner of proceeding, one part of a 17-keto-3-methoxy-8(14)-secogonane of Formula II is suspended in about 50 parts by weight of dry tetrahydrofuran and about 0.9 part by weight of lithium aluminum tri-t-butoxy hydride is added. The mixture is heated at about 70° C. for at least about one hour during which time replacement of the 17-keto group by a 17α-hydroxymethylene group is substantially complete. The starting material (II) is isolated by pouring the reaction mixture into a large excess of water; and extracting the organic materials into a water-immiscible solvent, such as ether; and evaporating the extract to leave the produce as a residue. The starting material can be purified, if desired, by recrystallization or by chromatography in accordance with well known techniques.

The acetylation and cyclization in one step of (II) to the gona-1,3,5(10),8,14-pentaenes according to the instant process is accomplished by contacting II with acetic anhydride and aqueous perchloric acid in an inert organic solvent, e.g., those illustrated hereinabove, and, preferably, ethyl acetate. The reaction temperature and time are not particularly critical although best results in terms of product purity and yield are obtained at reaction temperatures of from about 15° C. to about 40° C., preferably about 20° C. to 25° C. during reaction times of from about three to about fifteen minutes although, in most instances, about 5 minutes is entirely satisfactory. In one manner of proceeding, one part by weight of the 17-hydroxy-8(14)-secosteroid in about 60 parts by volume of ethyl acetate is added to about 100 parts by volume of a reagent which is about 1M in acetic anhydride and about 0.001M in perchloric acid (from 72% aqueous $HClO_4$) and made up to volume with ethyl acetate. The mixture is allowed to stand at about 25° C. for 5 minutes. The product (I) can be recovered from the reaction mixture by any conventional means. One convenient technique is to wash the reaction mixture with a dilute base, e.g., 5% aqueous sodium bicarbonate, separate the organic solvent layer and evaporate it to dryness, which leaves the product of Formula I as a residue. This may, if desired, be purified by recrystallization from a (lower)alkanol, e.g., methanol.

In the product of a total synthesis which has not included a suitable resolution stage the compounds prepared by the invention will be present as racemates. Using a convention approved by Fieser and Fieser, "Steroids," p. 336, (1959), the compounds designated as the d-forms are the enantiomers corresponding in cofiguration at C–13 to that of the natural hormone estrone. The corresponding enantiomorphs are consequently designated the l-forms and the racemates the dl-forms. Racemates will be depicted by structural formulas which show only the enantiomorphs of the d-configuration.

DESCRIPTION OF THE PREFERRED EMBODIMENTS

The following examples describe processes of the instant invention. They are given for the purpose of illustrating the invention, but are not to be construed to limit it in any manner whatsoever.

EXAMPLE 1 d-13-methyl-17β-hydroxy-3-methoxygona-1,3,5(10),8,14-pentaene, acetate 13-methyl-17β-hydroxy-3 - methoxy - 8,14 - secogona-1,3,5(10),9(11)-tetraen-14-one (0.500 g.) in ethyl acetate (30 ml.) is added to an ethyl acetate reagent (50 ml.) which is 1 M in acetic anhydride and $10^{-3}$ in perchloric acid (from 72% aqueous $HClO_4$). The reaction is allowed to stand at about 25° C. for five minutes, washed with aqueous sodium bicarbonate and the solvent dried and evaporated to dryness. The crystalline residue is recrystallized from methanol to give the title compound (0.425 g.), M.R. 85–87°;

$\lambda_{max.}^{KBr}$ 5.88, 6.25µ; $\lambda_{max.}^{EtOH}$ 310 mµ (ϵ 30,105); $[\alpha]_D^{25}=-166°$ (c.=1, CHCl$_3$); −172° (c.=1, dioxane).

EXAMPLE 2 d-13-ethyl-17β-hydroxy-3-methoxygona-1,3,5(10),8,14-pentaene, acetate 13-ethyl-17β-hydroxy - 3 - methoxy - 8,14 - secogona-1,3,5(10),9(11)-tetraene-14-one (1.10 g.) is dissolved in 100 ml. of a reagent made up to the proportions: 40 ml. of ethyl acetate containing .05 ml. of 72% perchloric acid and 4.8 ml. of acetic anhydride made up to a total volume of 50 ml. with ethyl acetate. The solution is allowed to stand at about 25° C. for 5 minutes washed with water, aqueous NaHCO$_3$ dried and evaporated. The residue is crystallized twice from methanol to provide the title compound 0.350 g., M.R. 71–73°, $[\alpha]_D^{25}=-179°$ (c.=1, dioxane);

$\lambda_{max.}^{KBr}$ 5.82, 6.25, 6.32, 8.0µ; $\lambda_{max.}^{EtOH}$ 309 mµ (ϵ 29,400)

EXAMPLE 3 d-13-ethyl-17β-hydroxy-3-methoxygona-1,3,5(10),8,14-pentaene, acetate 13-ethyl-17β-hydroxy - 3 - methoxy - 8,14 - secogona-1,3,5(10,9(11)-tetraen-14-one (1.10 g.) is treated as in Example 2 but on evaporation of the washed organic layer excess acetic anhydride is destroyed by boiling with methanol/pyridine and the resulting acetic acid azeotroped off with toluene. The dry residue is recrystallized from methanol to give the title product (0.750 g.), M.R. 70–71°, $[\alpha]_D=-169°$ (c.=1, dioxane).

EXAMPLE 4

13-propyl-3-methoxy-17β-hydroxygona-1,3,5(10),8,14-petaene, acetate 13-propyl-3-methoxy-17β - hydroxy - 8(14) - secogona-1,3,5(10),9(11)-tetraen-14-one is treated with acetic anhydride and perchloric acid in ethyl acetate according to the procedure of Example 1 and the named product, M.P. 95–96° C., is obtained.

EXAMPLE 5

13-ethyl-3-ethoxy-17β-hydroxygona-1,3,5(10),8,14-pentaene, acetate

13 - ethyl - 3 - ethoxy - 17β - hydroxy - 8(14) - secogona-1,3,5(10),9(11)-tetraen-14-one is treated with acetic anhydride and perchloric acid in ethyl acetate according to the procedure of Example 1 and the named product, having an ultraviolet absorption peak at 311 mµ (ϵ27,400), is obtained.

EXAMPLE 6

The following 8(14)-secosteroids:

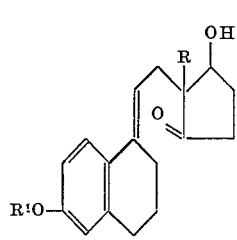

| R | R$^1$ |
|---|---|
| (CH$_3$)$_2$CH | (CH$_3$)$_2$CH |
| CH$_3$(CH$_2$)$_{18}$CH$_2$ | CH$_3$ |
| CH$_3$CH$_2$ | CH$_3$(CH$_2$)$_{18}$CH$_2$ |
| CH$_3$CH$_2$ | $\overline{CH_2CH_2CH_2CH_2CH}$ | are treated with acetic anhydride and perchloric acid in ethyl acetate according to the procedure of Example 1 and the following gona-1,3,5(10),8,14-pentaenes are obtained:

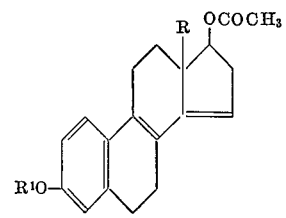

| R | R$^1$ |
|---|---|
| (CH$_3$)$_2$CH | (CH$_3$)$_2$CH |
| CH$_3$(CH$_2$)$_{18}$CH$_2$ | CH$_3$ |
| CH$_3$CH$_2$ | CH$_3$(CH$_2$)$_{18}$CH$_2$ |
| CH$_3$CH$_2$ | $\overline{CH_2CH_2CH_2CH_2CH}$ |

EXAMPLE 7

The procedure of Example 1 is repeated, respectively, at 15° C. and at 40° C. Substantially the same results are obtained.

The procedure of Example 1 is repeated, respectively, allowing a three minute and a 15 minute reaction time before washing with aqueous sodium bicarbonate. Substantially the same results are obtained.

EXAMPLE 8 d-13-ethyl-17α-hydroxy-2-methoxygona-1,3,5(10),8,14-pentaene, acetate

The procedure of Example 2 is repeated, substituting as starting material as equivalent amount of 13-ethyl-17α-hydroxy - 3-methoxy-8,14-secogona-1,3,5(10),9(11)-tetraene-14-one, and the title compound is obtained.

What we claim is:

1. A process for the preparation of a gona-1,3,5(10), 8,14-pentaene of the formula

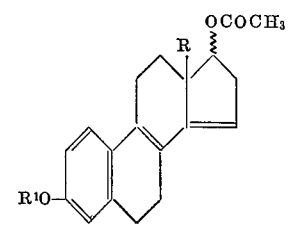

wherein R and R$^1$ are alkyl of from about 1 to about 20 carbon atoms, which comprises treating the corresponding 17-hydroxy-8(14)-secogonatetraen-14-one with acetic anhydride and aqueous perchloric acid in a substantially non-polar, inert organic solvent until cyclization and replacement of the 17-hydroxy group by a 17-acetoxy group is substantially complete.

2. A process as defined in claim 1 wherein the process is carried out at a temperature of from about 15° C. to about 40° C. for from about 3 to about 15 minutes.

3. A process as defined in claim 1 wherein said solvent is ethyl acetate.

4. A process as defined in claim 1 wherein said gona-1,3,5(10),8,14-pentaene is 13-methyl-17β-hydroxy-3-methoxygona-1,3,5(10)8,14-pentaene, acetate.

5. A process as defined in claim 1 wherein said gona-1,3,5(10),8,14-pentaene is 13-ethyl-17β-hydroxy-3-methoxygona-1,3,5(10),8,14-pentaene, acetate.

References Cited

Kuo et al.: Journ. Org. Chem., vol. 33, No. 8, August 1968, pp. 3126–3132.

Rufer et al.: Liebigs Ann. Chem., 701, 206–216 (1967).

LEWIS GOTTS, Primary Examiner

E. G. LOVE, Assistant Examiner

U.S. Cl. X.R.

195—51; 260—488, 586, 999